(12) United States Patent
McIndoe et al.

(10) Patent No.: US 10,979,094 B2
(45) Date of Patent: Apr. 13, 2021

(54) SPEAKER MICROPHONE WITH SWITCHING TO AND FROM AN ATTACHED DEVICE

(71) Applicant: TAIT INTERNATIONAL LIMITED, Christchurch (NZ)

(72) Inventors: James Neill McIndoe, Christchurch (NZ); Cameron Patrick Greig O'Keeffe, Christchurch (NZ); Justin Allan Standring, Christchurch (NZ); Tong-Wook Shinn, Christchurch (NZ)

(73) Assignee: TAIT INTERNATIONAL LIMITED, Christchurch (NZ)

( * ) Notice: Subject to any disclaimer, the term of this patent is extended or adjusted under 35 U.S.C. 154(b) by 0 days.

(21) Appl. No.: 16/530,078

(22) Filed: Aug. 2, 2019

(65) Prior Publication Data

US 2020/0044675 A1 Feb. 6, 2020

Related U.S. Application Data

(60) Provisional application No. 62/713,910, filed on Aug. 2, 2018, provisional application No. 62/729,478, filed on Sep. 11, 2018.

(51) Int. Cl.
*H04W 88/06* (2009.01)
*H04B 1/3827* (2015.01)
*G06F 3/16* (2006.01)
*H04R 3/00* (2006.01)
*H04W 4/021* (2018.01)
*H04B 17/318* (2015.01)
*H04W 4/10* (2009.01)

(52) U.S. Cl.
CPC ............ *H04B 1/385* (2013.01); *G06F 3/165* (2013.01); *H04R 3/00* (2013.01); *H04B 17/318* (2015.01); *H04R 2420/07* (2013.01); *H04W 4/021* (2013.01); *H04W 4/10* (2013.01); *H04W 88/06* (2013.01)

(58) Field of Classification Search
CPC ....... H04B 1/385; H04B 17/318; G06F 3/165; H04R 3/00; H04R 2420/07; H04W 88/06; H04W 4/021; H04W 4/10; H04W 4/90
See application file for complete search history.

(56) References Cited

U.S. PATENT DOCUMENTS

| | | | |
|---|---|---|---|
| 10,015,658 B1* | 7/2018 | Alfaro | H04W 4/10 |
| 10,341,839 B2 | 7/2019 | Alfaro et al. | |
| 2006/0262771 A1* | 11/2006 | Martinez | H04L 12/4633 370/349 |
| 2013/0044710 A1 | 2/2013 | Martinez et al. | |
| 2016/0219418 A1* | 7/2016 | Sakazume | H04W 76/45 |

* cited by examiner

*Primary Examiner* — Said M Elnoubi
(74) *Attorney, Agent, or Firm* — Ladas & Parry LLP; Malcolm J. MacDonald

(57) ABSTRACT

A smart speaker/microphone is described that optionally connects to an attached device that may be an LMR radio. The smart speaker/microphone can operate independently to an attached device. Preferentially the smart speaker/microphone contains apparatus to enable the switching of key functions to an attached device based on either automatic or manual change in a switching condition.

16 Claims, 14 Drawing Sheets

SPEAKER MICROPHONE WITH SWITCHING TO AND FROM AN ATTACHED DEVICE

This application claims priority under 35 U.S.C. 119(e) to U.S. Provisional Application No. 62/713,910, filed on Aug. 2, 2018, and to U.S. Provisional Application No. 62/729,478, filed on Sep. 11, 2018, the contents of both of which are incorporated herein by reference.

FIELD OF THE INVENTION

This invention relates to a smart speaker microphone that may be connected to an attached device such as a land mobile radio (LMR) for the purpose of audio operation and function buttons. More particularly the invention relates to apparatus for switching control of the speaker, microphone and button operations between the speaker microphone and the attached device.

BACKGROUND TO THE INVENTION

Typical speaker microphones are wearable devices that connect via wire to an LMR radio and operate directly from the attached LMR radio. In this configuration the speaker mic is acting as a simple accessory to the attached LMR radio.

Another common speaker mic device is one that operates via wireless connecting to the radio via technology such as Bluetooth. In this case the speaker mic has no cable connecting the accessory to the LMR radio.

Public safety agencies around the world use a number of different forms of LMR. They are also considering the deployment of broadband bearers such as LTE for improving data connectivity in their radio systems. Utility industries such as electricity distribution are also looking to exploit similar technology. The expectation is to deploy this relatively wideband technology to operate in parallel with existing narrow band systems such as P25.

One method of enabling such multi-bearer operation is to introduce intelligence and multi-bearer capability into a smart microphone/speaker, herein referred to as a smart mic. A microphone/speaker is a traditional accessory used widely within the industry. The smart mic can even become a product in its own right capable of Voice Over Internet Protocol (VOIP) operation which means the attachment of an LMR radio becomes optional. A VOIP solution can operate over an IP network such as cellular including LTE.

SUMMARY OF THE INVENTION

It is an object of the invention to provide for improved operation of a speaker mic when connected to an attached LMR radio.

In one aspect the invention resides in wearable wireless communication system comprising: a primary processing device comprising a battery powered accessory having cellular communication capability, a secondary processing device comprising a battery powered handset having LMR communication capability, and a communication link between the primary and secondary processing devices; wherein the wearable system maintains audio and control functionality for a user by switching between cellular network communication via the primary processing device and LMR network communication via the secondary processing device, according to detection by the primary processing device of predetermined switching events.

In a preferred embodiment the switching events include: movement of the user between predetermined geographic areas, relative strength or availability of cellular and LMR network coverage, and loss of power or other fault in either of the primary or secondary devices.

In another aspect the invention resides in a method of automatically switching the operation of a speaker mic from a local processor on the smart mic to a processor associated with the attached device (that may be an LMR radio). This includes detecting a selective switching decision on the smart mic and automatically switching the audio functions and function button operation across to the attached device.

The switching decisions include detecting the device has crossed a geographic boundary, detecting the signal strength of the associated LMR device is better than the cellular device and detecting power conditions relevant to cause a switch. Audio functions means the ability to operate the speaker or microphone. Function buttons are used for a number of purposes, these include but are not limited to; emergency call, report location, report status, setup a one to one call or setup a group call on a preset channel, and Push To Talk (PTT).

In another aspect the invention resides in a method of manually switching the operation of a speaker mic from a local processor on the smart mic to a processor associated with the attached device (that may be an LMR radio). This includes informing the user of a switching condition whereupon the user manually selects to operate the smart mic from the attached device. Switching conditions include geographic location, signal strength and smart mic power status.

In another aspect the invention resides in a method of selectively applying additional audio processing in the smart mic on the audio at the LMR radio. If upon the press of a PTT button on the smart mic that is operating normally then applying the audio processing. If however, upon the press of a PTT button on the smart mic the smart mic is not operational then automatically operating the audio functions solely from the LMR radio in the absence of audio processing at the smart mic. In this condition the smart mic is operating without any processing and PTT control function is connected directly to the LMR device. This switching decision can be based upon low or loss of power or the smart mic processing failing to function.

An attached LMR radio can be any type of radio including but not limited to P25 (APCO 25), Tetra, DMR (Digital Mobile Radio), or analogue LMR.

BRIEF DESCRIPTION OF THE DRAWINGS

Preferred embodiments of the invention will be described with respect to the accompanying drawings, of which.

DETAILED DESCRIPTION OF THE INVENTION

Figure 1:
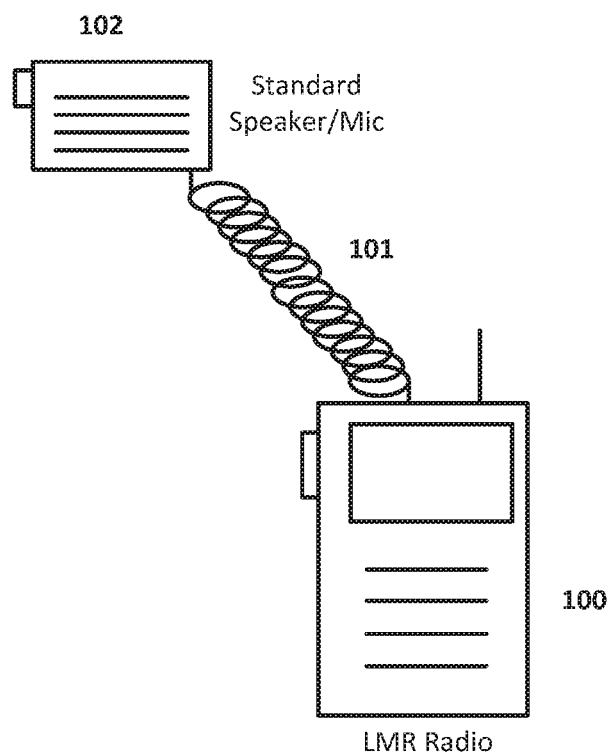
FIG. 1 shows a typical LMR radio attached to a standard speaker/mic.

Referring to the drawings it will be appreciated the invention may be performed in a variety of ways using many forms of wearable or otherwise portable speaker mic and attached to many forms of LMR radio including but not limited to DMR, P25, Analog and Tetra radios.

A smart mic requires its own processing capability if it is intended to operate independently from an attached device such as an LMR radio. This means that when connected to a radio then two points of processing exist; the processor on the smart mic and the processor on the attached radio. There are a number of possible reasons for selecting processor control on the smart mic versus the attached device.

FIG. 1 shows a typical configuration of an LMR radio 100 connected to a standard speaker mic 102 through a cable 101. This is a common configuration used in the field today. For example a police officer may be wearing an LMR radio 100 on a belt and a cable 101 may run up the body to a speaker mic located on a lapel or another convenient position. The cable 101 typically carries audio signals and push to talk (PTT) signals. This type of speaker mic 102 typically has minimal processing capability and represents an extension of the functionality of the attached LMR radio.

Figure 2:
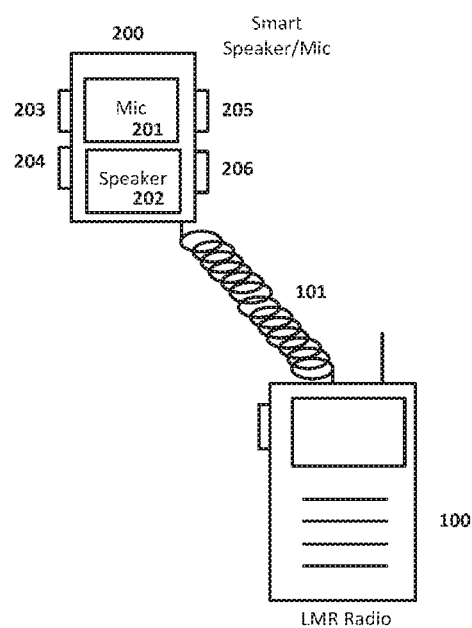
FIG. 2 shows a typical LMR radio connected to a smart mic.

FIG. 2 shows a smart speaker mic 200 of the form being described herein. The smart mic contains its own processor. It is optionally connected to an LMR radio 100 via a cable 101 that may be the same as that described in FIG. 1. The smart mic 200 also contains one or more microphones 201 and one or more speakers 202. The smart Mic contains multiple PTT buttons where two are shown 203 and 204, one for LMR PTT and one for VOIP PTT. There are also a number of function buttons where two are shown 205 and 206. The microphones may also include externally connected microphones (not known) such as earpieces that may be wired or wireless. The speakers may also include externally connected speakers such as earpieces. The PTT and function buttons may also include external function buttons.

Figure 3:
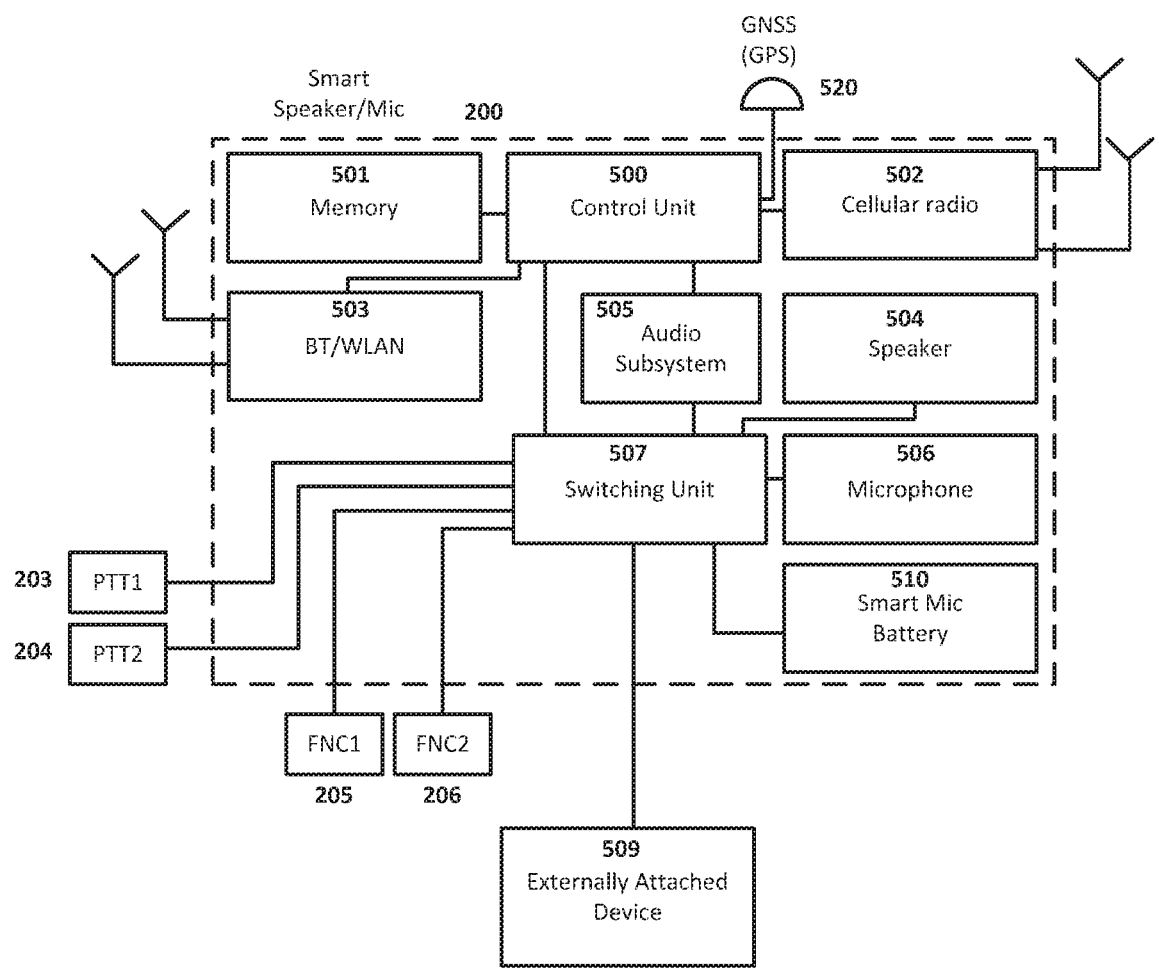
FIG. 3 shows a system sketch of the smart mic.

FIG. 3 shows components of a smart mic 200 of the form described herein. The smart mic contains a control unit 500 which is a processor and that implements control and communication functions. It connects to a GPS unit 520 for the purpose of reading smart mic location. For convenience in this document the US technology is described which is GPS however all forms of Global Navigation Satellite System (GNSS) are included. The computer programs that implement the algorithms on the platform are contained within local memory 501 and executed on the smart mic.

The smart mic optionally contains a cellular radio 502 used for communicating over the cellular network. The cellular radio 502 is connected to the control unit 500. The smart mic contains a Bluetooth and or WLAN unit 503 used for communicating to local equipment over this medium. The Bluetooth and or WLAN 503 are connected to the control unit 500. The smart mic also contains one or more microphones 506 and one or more speakers 504 and a number of PTT and function buttons 203, 204 and 205, 206 respectively. These are preferentially connected to the control unit 500 via a switching control unit 507 and/or the audio subsystem 505. Audio subsystem processing may include amplifying, adjusting audio levels, injecting audio and audio filtering, or applying other algorithms. The smart mic also contains a local power source 510 that in this case is a battery.

Also connected to the switching unit is an externally attached device 509 that in this case is an LMR radio. This LMR radio may be a handheld that operates from a battery. Alternatively the LMR radio may be installed in a vehicle. In the LMR industry this is typically referred to as a mobile radio that operates from a vehicle power supply. The attached device also has a processor, memory, speaker, microphone and various communication subsystems which are known in the industry. In the case of an LMR radio an RF transceiver, PTT button, volume and channel controls are included.

Figure 4:
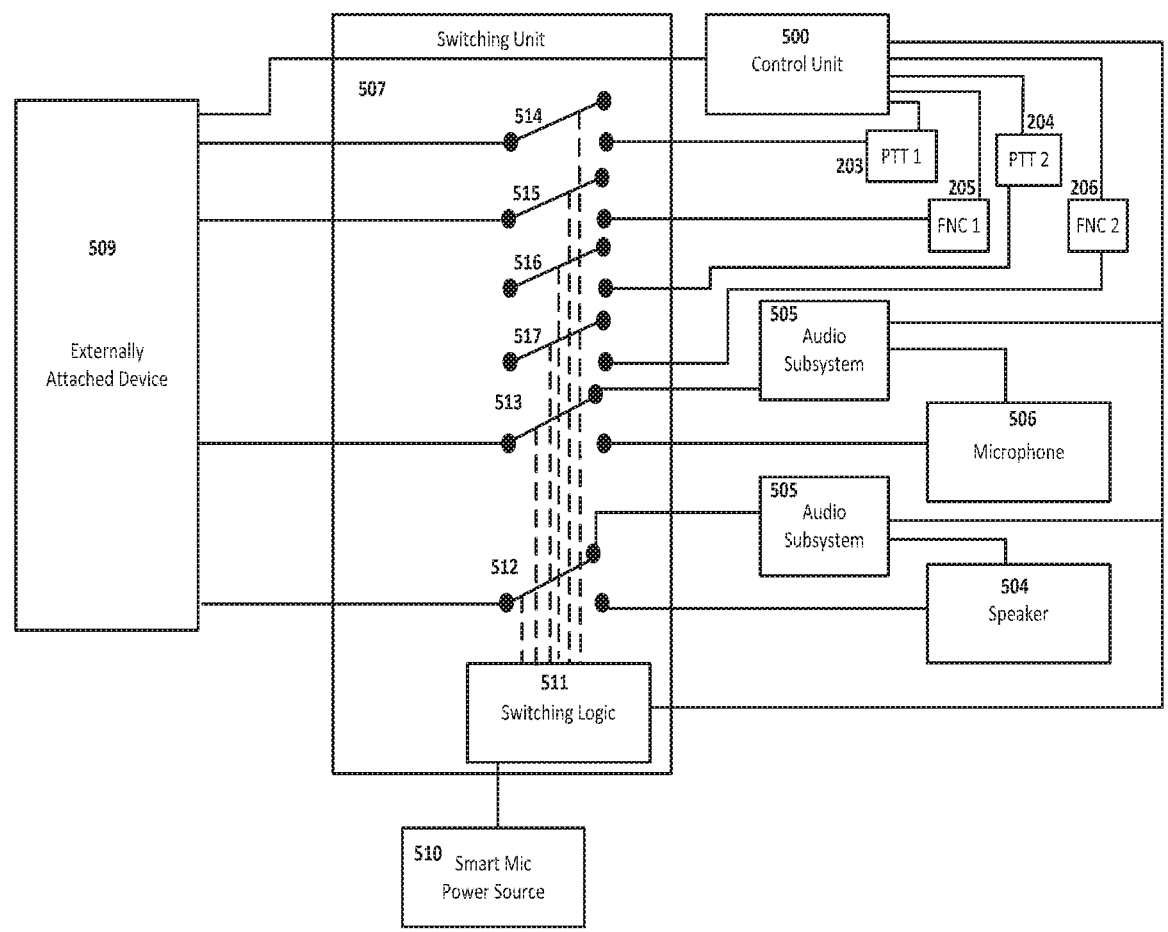
FIG. 4 shows a schematic of a switching control unit.

FIG. 4 shows a schematic that highlights the operation of the switching unit that represents a preferred component in FIG. 3. The switching unit contains a switching logic 511 that independently controls the state of multiple switches 512, 513, 514, 515, 516 and 517 dependent upon the status of the smart mic power source 510 or other factors as defined by the control unit 500. These switches may be physical or they may be implemented in software. Each switch discussed has two positions. In the open position the switch may either connect to another line or it may be open circuit. In the closed position the switch will connect to a line.

For each of the switched lines, 512 to 517, they are all brought to a connector at the edge of the physical device and some or all may be wired via cable across to the external device 509. In the text that follows it is assumed 512 to 515 are physically wired to 509 whereas 516 and 517 are not wired. This is by way of example only.

Switch 512 represents a connection to the smart mic speaker where upon either a) switch 512 is open then the audio from the attached device 509 is channeled through an audio subsystem 505 where additional audio from the control unit 500 may be added then the combined audio is channeled to a speaker 504 or b) switch 512 is closed then the audio from the attached device 509 is channeled directly to the speaker 504.

Switch 513 represents a connection to the smart mic speaker where upon either a) switch 513 is open then the audio is channeled from the microphone 506 through the audio subsystem 505 where additional audio from the control unit 500 may be added then the combined audio is channeled to the attached device 509 or b) switch 513 is closed then the audio from the microphone 506 is channeled to the attached device 509 directly.

Switch 514 represents a connection to the smart mic speaker at the switching unit. In this case there is a physical connection to the attached device. Either a) switch 514 is open and the PTT1 button events 203 are not channeled to the attached device 509 or b) switch 514 is closed then PTT1 button events 203 are channeled directly to the attached device 509 whereupon the attached device 509 may take action. In both cases the PTT1 button events 203 are channeled to the control unit via the switching logic 511 whereupon the control unit 500 may take action. In one example configuration, the PTT1 203 button activates an LMR call in the attached device 509 and does not activate a VOIP call in the control unit 500. In another example configuration PTT1 203 button can activate both an LMR call on the attached device 509 and activate a VOIP call in the control unit 500.

Switch 515 represents a connection to the smart mic speaker at the switching unit. In this case there is a physical connection to the attached device. Either a) switch 515 is open and the function button events 205 are not channeled to the attached device 509 or b) switch 515 is closed then function button 205 are channeled directly to the attached device 509 whereupon the attached device 509 may take action. In both cases the function button events 205 are channeled to the control unit via the switching logic 511 whereupon the control unit 500 may take action. The function buttons may include a variable status element such as a volume control that creates a variable level as opposed to a binary state.

Switch 516 represents a connection to the smart mic speaker at the switching unit. In this case there is no physical connection to the attached device. Either a) switch 516 is open and the PTT2 button events 204 are not channeled to the edge of the switching unit or b) switch 516 is closed then PTT2 button events 204 are terminated at the edge of the switching unit. In both cases the PTT2 button events 204 are channeled to the control unit via the switching logic 511 whereupon the control unit 500 may take action. In this case the PTT 2 button only operates a VOIP call on the smart mic.

Switch 517 represents a connection to the smart mic speaker at the switching unit. In this case there is no physical connection to the attached device. Either a) switch 517 is open and the function button events 206 are not channeled to the edge of the switching unit or b) switch 517 is closed then function button 206 are terminated at the edge of the switching unit. In both cases the function button events 205 are channeled to the control unit via the switching logic 511 whereupon the control unit 500 may take action. The function buttons may include a variable status element such as a volume control that creates a variable level as opposed to a binary state.

The function buttons may include a variable status element such as a volume control that creates a variable level as opposed to a binary state.

There are a number of possible reasons for switching processing between the smart mic and the attached device. These include geographic location, signal strength and power level.

Figure 5:
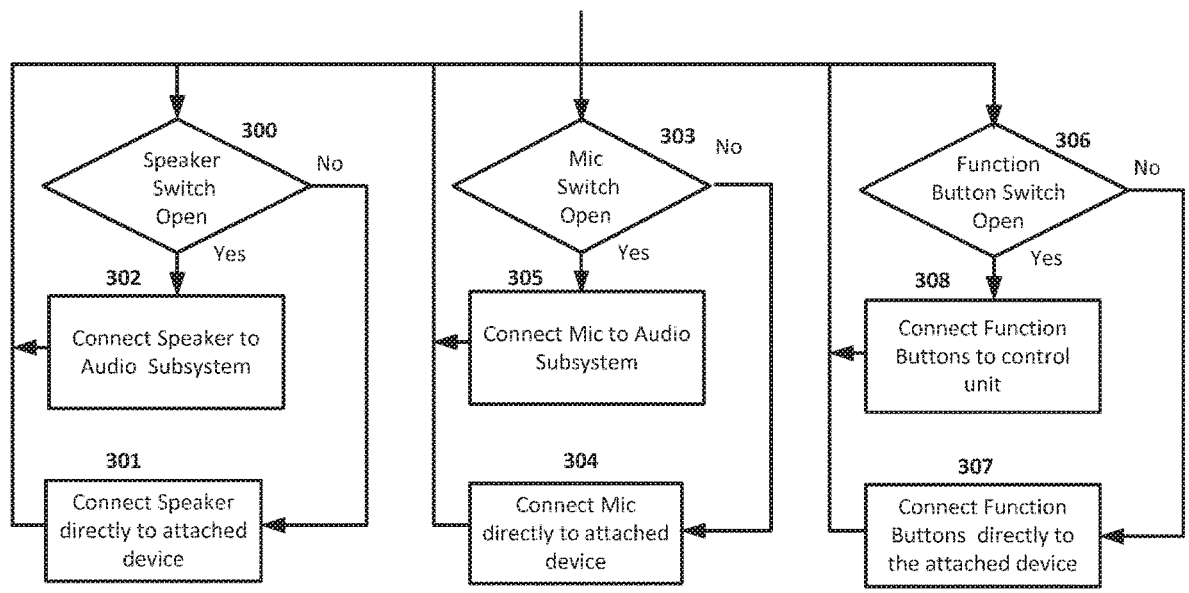
FIG. 5 describes a flow diagram for switching functions between operation on the smart mic and an attached device.

FIG. 5 details a flow diagram of the present invention that describes the operation of the switching logic 511. In step 300, if the speaker switch 512 is closed then step 301 shows the speaker 504 is connected directly to the attached device 509. If the speaker switch 512 is open then step 302 shows the speaker 504 is connected to the audio subsystem 505.

Step 303 shows if the mic switch 513 is closed then step 304 shows the microphone 506 is connected directly to the attached device 509. If the mic switch 513 is open then step 305 shows the microphone 506 is connected to the audio subsystem 505.

Step 306 shows an example of a button. In this case, if the function button switch 515 is closed then the function button 205 is connected directly to the external device 509. If the function button 205 switch 515 is open then they are no longer connected to the attached device 509. Irrespective of the state of switch 515 the function buttons 508 are connected to the control unit 500. The same model applies to the other buttons 203, 204 and 206.

Figure 6:
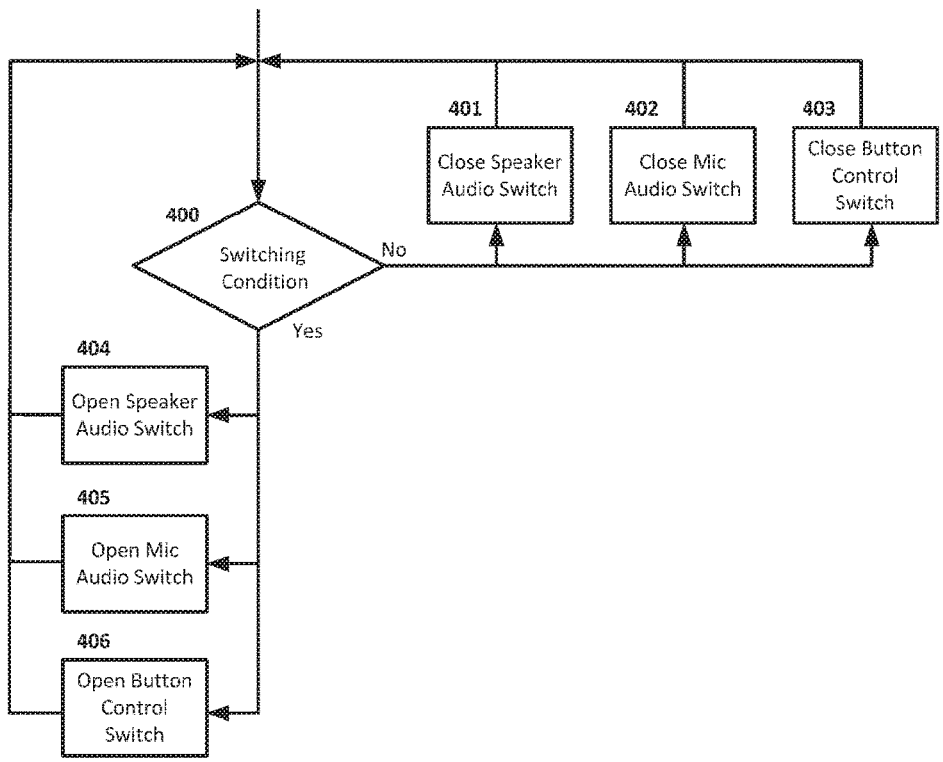
FIG. 6 is a flow diagram for detecting a switching condition and automatically switching audio and button control between smart mic and attached device.

FIG. 6 shows a flow diagram for control of the switches 512, 513, 514, 515, 516 and 517. A switching condition represents some reason for switching operation between the smart mic and the attached device. In step 400 a switching condition is assessed and if the switching condition is false then in steps 401, 402 switches 512 and 513 respectively are closed so operation remains with the attached device. Also if the switching condition is false then in step 403, switches 514, 515, 516 and 517 are closed. If however the switching condition is true then in steps 404, 405 switches 512 and 513 respectively are open so operation remains with the smart mic. Also if the switching condition is true then in step 406 switches 514, 515 and 516 and 517 are opened.

Figure 7:
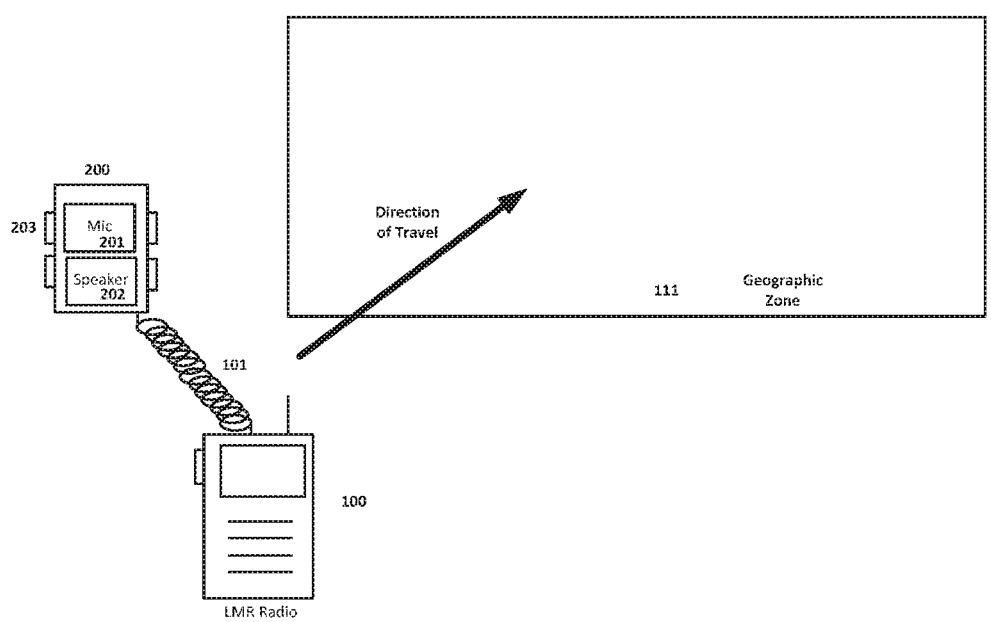
FIG. 7 illustrates a use case in which the end user devices cross a geographic boundary.

FIG. 7 illustrates a case where the end user equipment (made up of smart mic 200 connected to LMR radio 100) is moving and crosses a pre-defined geographic boundary). Given the crossing of a geographic boundary it may be preferable to operate based on LMR instead of cellular so the switching condition 400 in FIG. 6 would be false.

Figure 8:
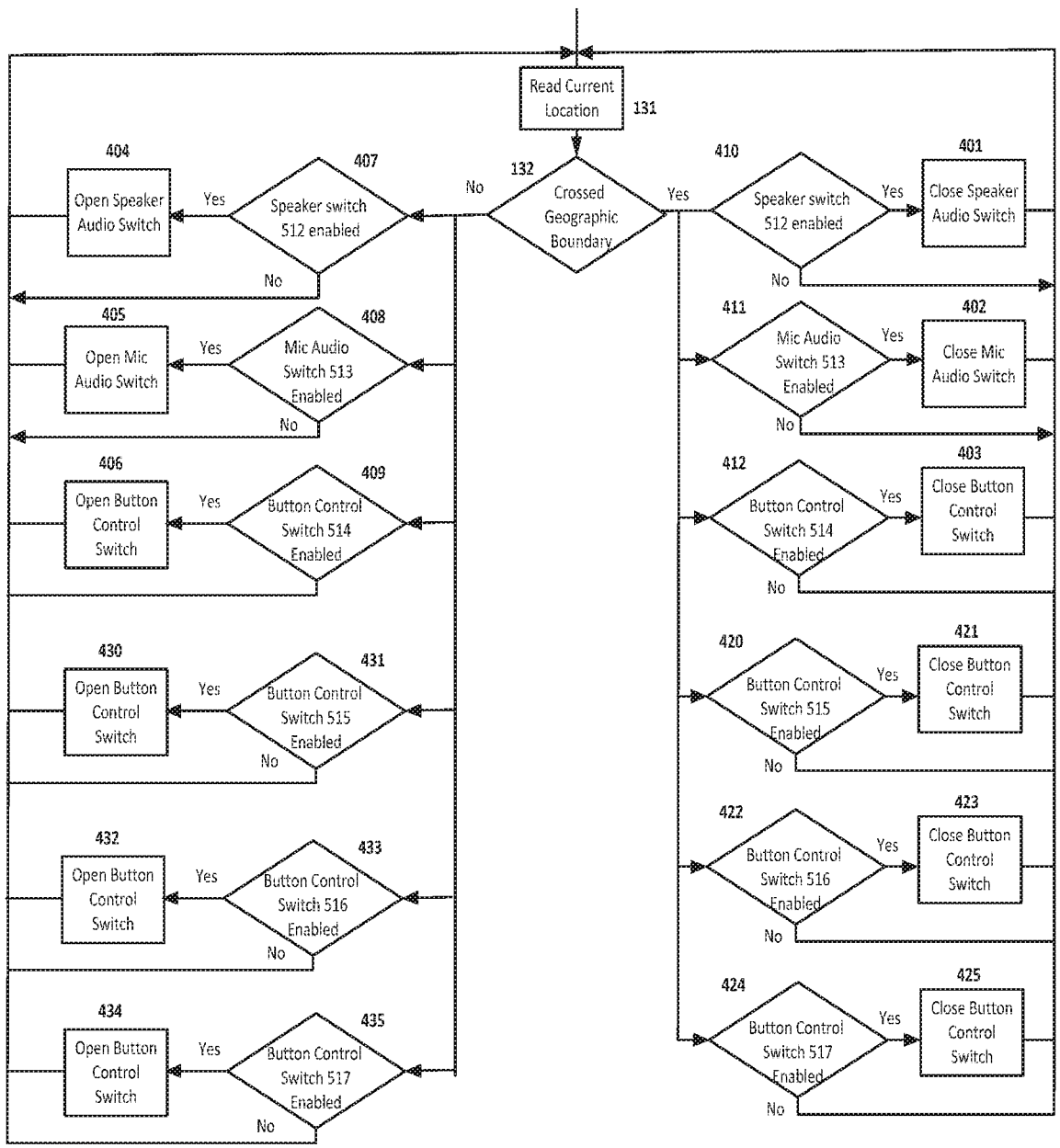
FIG. 8 shows a flow diagram illustrating the process for switching functions based on location.

FIG. 8 illustrates a process in which location is a decision point for operating within the smart mic or switching across to the attached device. In step 131, the current location is read from the GPS unit 520. This location is compared to a predefined boundary configured in the control unit and if the boundary is crossed then operation of functions is selectively switched across to the attached device.

FIG. 8 illustrates the selective control of the switches 512, 513, 514, 515, 516 and 517. The control unit enables the switches that may change state. In step 131, the current location is read and in step 132 the location is compared to a predefined boundary. A check is made in step 132 to assess if the location has crossed the boundary defined by the control unit 500. If the boundary has been crossed then in step 410 an assessment is made to check if the controller has enabled the speaker audio switch to change state. If it has not then nothing happens. If it is enabled then in step 401, the switch 512 is closed. In step 411 an assessment is made to check if the controller has enabled the mic audio switch to change state. If it is enabled then in step 402, the switch 513 is closed. In step 412 an assessment is made to check if the controller has enabled the button control switch 514 to change state. If it is enabled then in step 403, the switch 514 is closed. This process is repeated for the button control switches 515, 516 and 517. Through this process, the controller is able to configure the system so that only certain functions or buttons switch control in the event of a geographic boundary being crossed. For example, speaker and mic switch control across to the attached device 509 whereas button controls remains locally active.

Referring to FIG. 8, if during the assessment of the location in step 131 the geographic boundary has not been crossed then in step 407 an assessment is made to check if the controller has enabled the speaker audio switch change state. If it is enabled then in step 404 the switch 512 opens. If it is not enabled then nothing happens. In step 408 an assessment is made to check if the controller has enabled the mic audio switch to change state. If it is enabled to open then in step 405 the switch 513 opens. If it is not enabled then nothing happens. In step 409 an assessment is made to check if the controller has enabled the button control switch to change state. If it is enabled then in step 406 the switch 514 opens. If it is not enabled then nothing happens.

Figure 9:
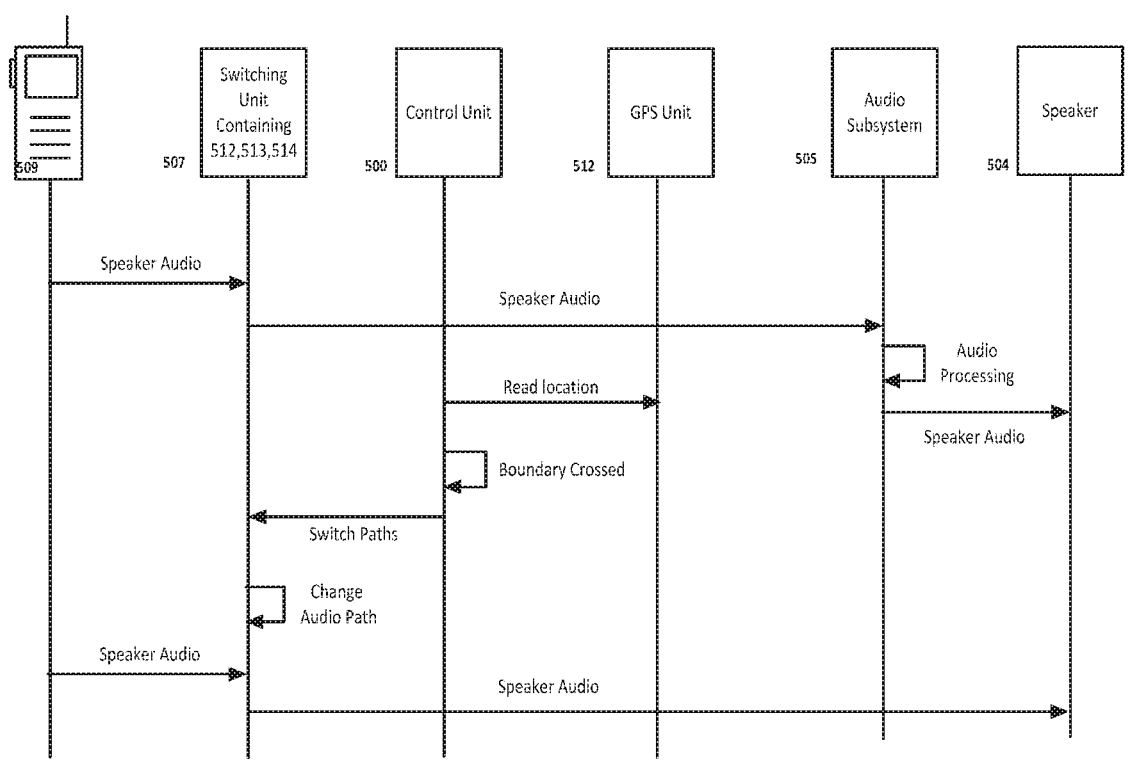
FIG. 9 shows a sequence diagram illustrating the process for switching an audio function based on location.

FIG. 9 shows a sequence diagram in which initially the speaker audio from 509 is being passed through the switching unit 507 and through the audio subsystem 505 to the speaker 504. The control unit 500 reads the location from the GPS unit 520 and then determines that a geographic boundary has been crossed. This results in the speaker audio path being selectively changed to go directly to the speaker or in other words the LMR radio becomes the direct source of speaker audio. Similarly (but not shown) the microphone functions and function buttons are selectively switched to operate from the LMR radio 509.

Figure 10:
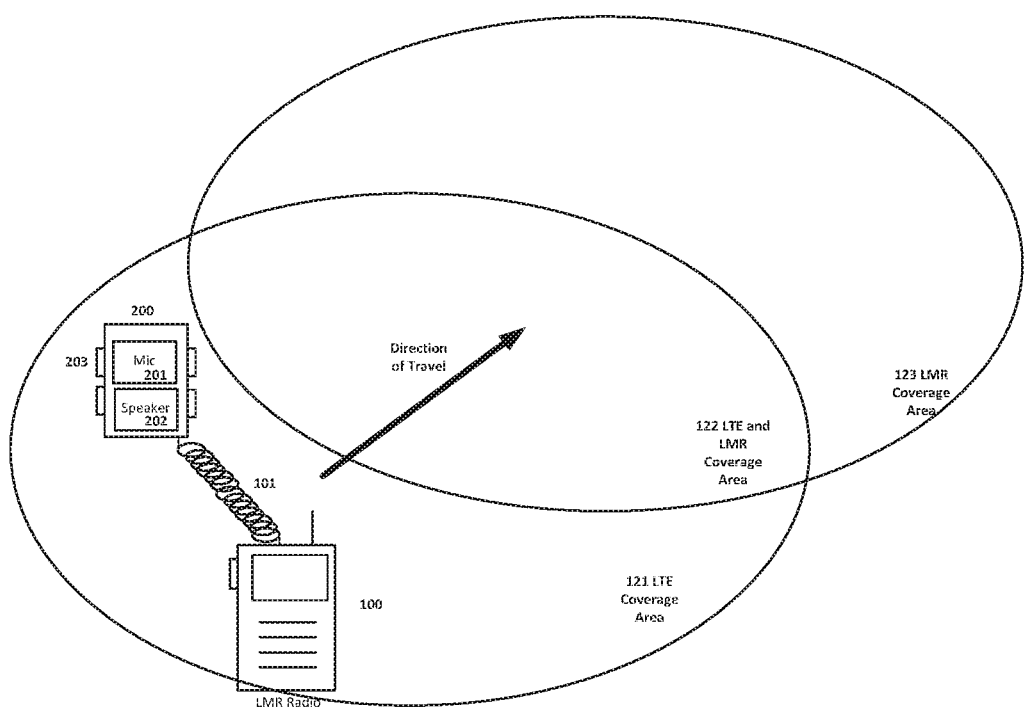
FIG. 10 illustrates a use case in which the end user devices move such that LMR coverage becomes better than cellular.

FIG. 10 describes a case where the end user equipment (made up of smart mic 200 connected to LMR radio 100) is moving. Initially it is located in a zone 121 where the only coverage available is cellular (LTE). In this condition the operation of all audio and function button functions will be solely under control of the smart mic 200. The end user equipment moves to a geographic area 122 where both LTE and LMR coverage are good and in this case a configuration setting defines the preferred setting of the switches 512, 513, 514, 515, 516 and 517. Eventually the end user equipment moves to a zone 123 where only LMR coverage exists. In this case control of functions is switched across to the attached LMR device. Preferably this means the end user equipment will operate on the best network based on signal strength.

Figure 11:
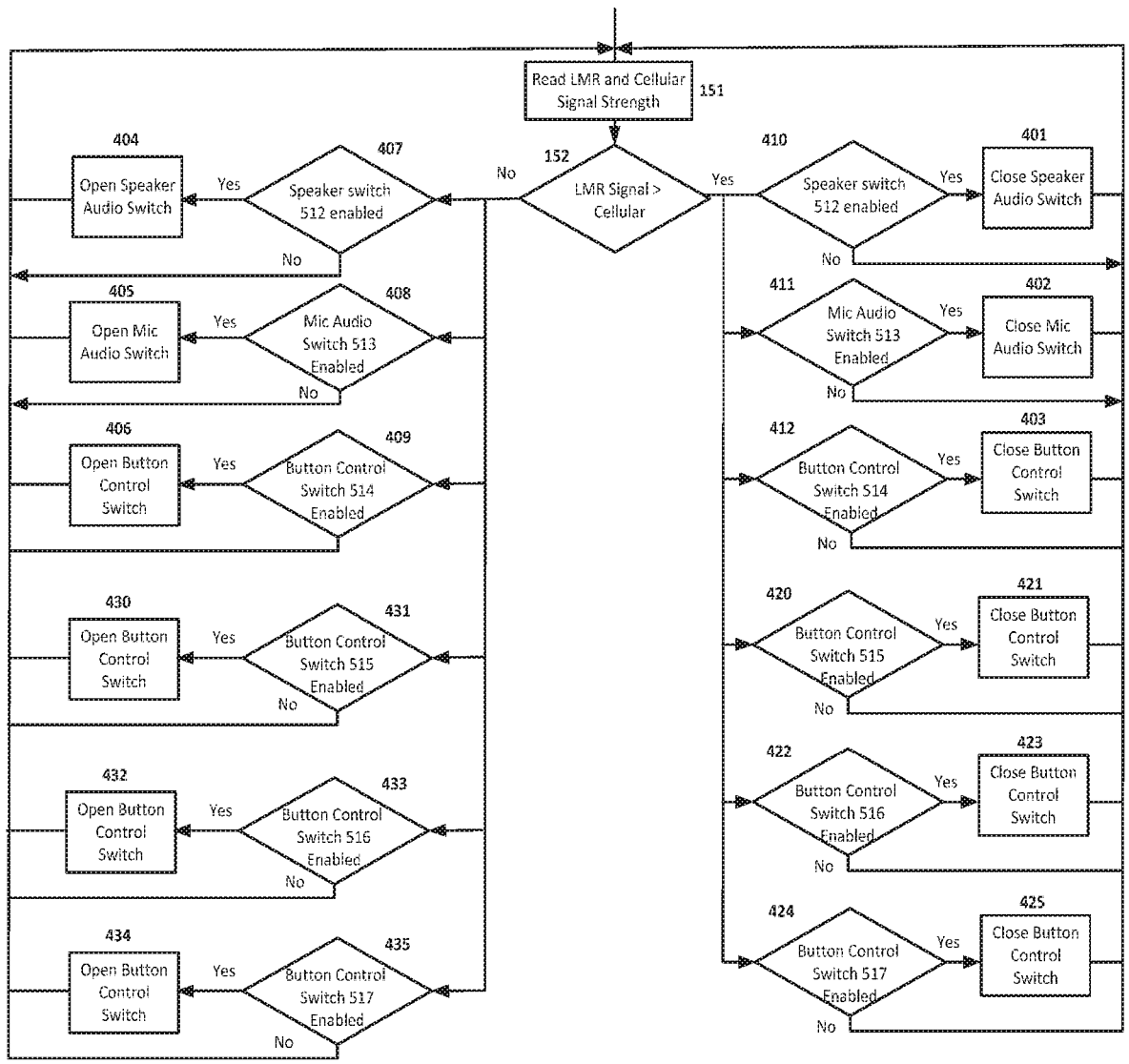
FIG. 11 shows a flow diagram illustrating the process for switching functions based on signal strength.

FIG. 11 describes a process in which signal strength becomes a decision point for operating within the smart mic or switching across to the attached device. In step 151, the signal strength of LMR and cellular are both read by the control unit 500. These values are compared and if the LMR signal strength is greater (by some practical amount) than the cellular signal then then operation of functions is selectively switched across to the attached device in the same way as described in FIG. 8.

Figure 12:
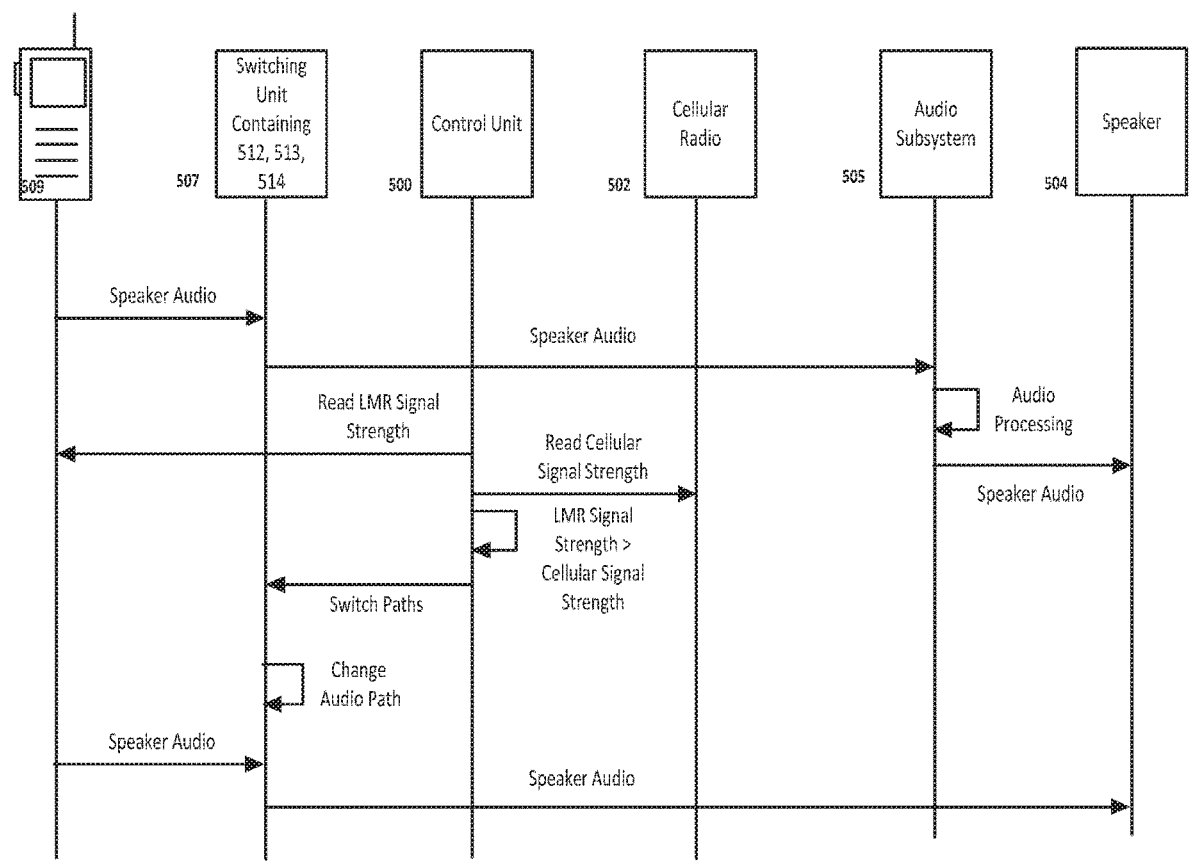
FIG. 12 shows a sequence diagram illustrating the process for switching an audio function based on signal strength.

FIG. 12 shows a sequence diagram in which initially the speaker audio from 509 is being passed through the switching unit 507 and through the audio subsystem 505 to the speaker 504. The control unit 500 reads the LMR signal strength from the attached device 509 and reads the cellular signal strength from the cellular radio 502. These values are compared and if the LMR signal strength is greater (by some practical margin) than the cellular signal strength then the speaker audio path is selectively changed to go directly to the speaker or in other words the LMR radio becomes the direct source of speaker audio. Similarly (but not shown) the microphone functions and function buttons are selectively switched to operate from the LMR radio 509.

In another form the switching logic 511 may monitor location and indicate to the user that a geographic boundary is approaching whereupon the user may manually switch operation resulting in switches 512, 513, 514, 515, 516 and 517 changing state.

In another form the switching logic 511 may monitor the signal strength of LMR and cellular and indicate to the user that a signal strength boundary is approaching in preference of either LMR or cellular whereupon the user may manually switch operation resulting in switches 512, 513, 514, 515, 516 and 517 changing state.

In another form the switching logic may react to a manual change made by the user that results in switches 512, 513, 514, 515,516 and 517 changing state.

Figure 13:
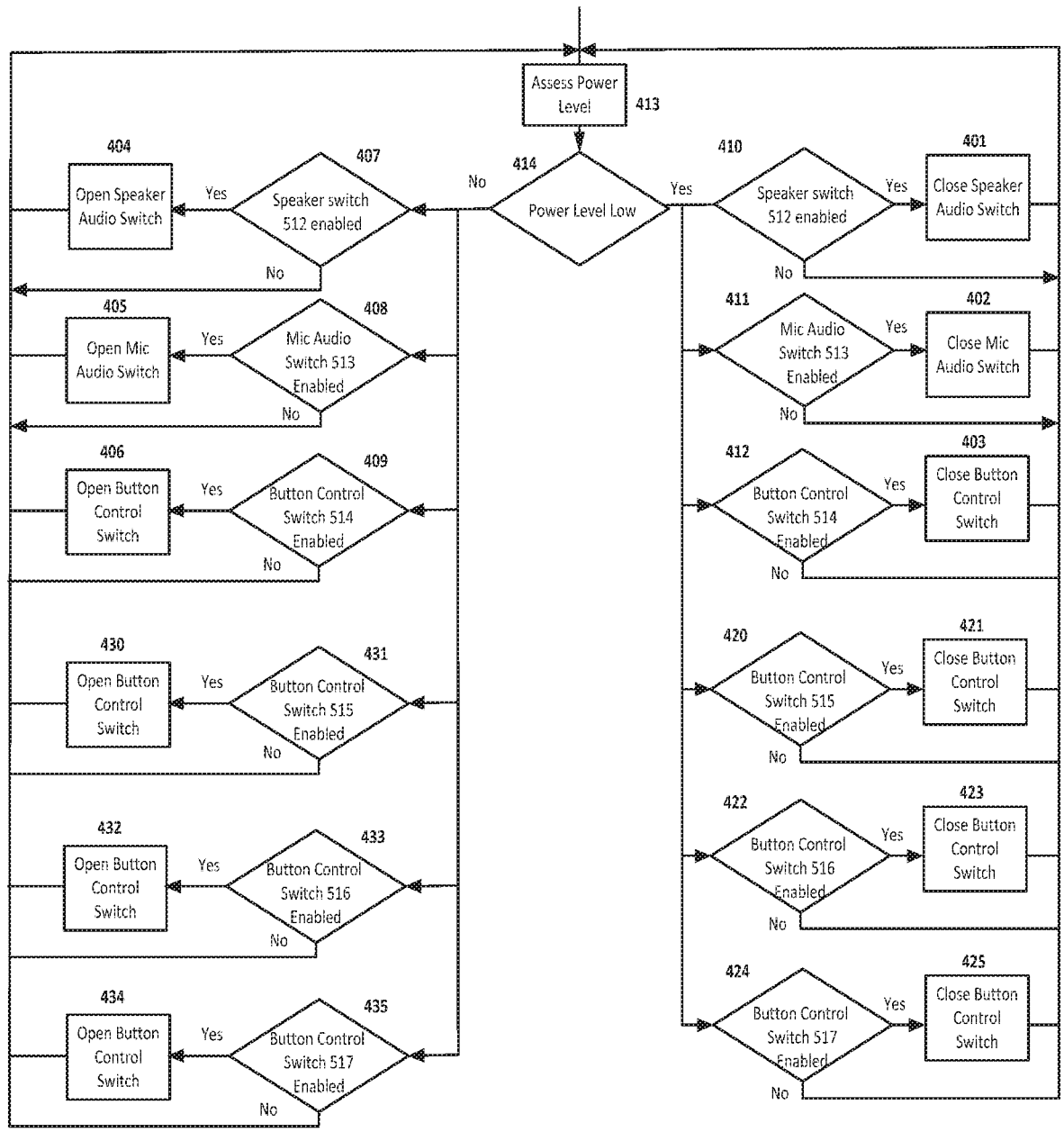
FIG. 13 is a flow diagram for detecting power status of the smart mic and selectively switching audio and button control.

FIG. 13 illustrates another form of selectively controlling the switches 512, 513, 514, 515, 516 and 517. In step 413 the power level of the smart mic battery is assessed. A check is then made in step 414 to assess if the power level is above or below a pre-defined threshold as defined by the control unit 500. If power is below a pre-defined threshold then in step 410 an assessment is made to check if the controller has enabled the speaker audio switch to change state. If it has not then nothing happens. If it is enabled then in step 401, the switch 512 is closed. In step 411 an assessment is made to check if the controller has enabled the mic audio switch to change state. If it is enabled then in step 402, the switch 513 is closed. In step 412 an assessment is made to check if the controller has enabled the button control switch 514 to change state. If it is enabled then in step 403, the switch 514 is closed. This process is repeated for the button control switches 515, 516 and 517. Through this process, the controller is able to configure the system so that only certain functions switch off in the event of low power. For example, speaker and mic switch across to the attached device 509 or shut down completely whereas button controls remain active. Alternatively, in the case of a smart mic operating independently (meaning not attached to an external device 509) the controller may configure for speaker, audio and function buttons to shut down whereas location information may still be periodically read from 512 and periodically transmitted over cellular 502 or Bluetooth and or WLAN 503.

In another form the switching logic 511 may monitor the available power level of the smart mic and it may indicate low power to the user where upon the user may manually switch operation resulting in switches 512, 513 and 514 changing state.

Referring again to FIG. 13, if during the assessment of the power level in 413, the power level is above a pre-defined threshold as evaluated in step 414 then in step 407 an assessment is made to check if the controller has enabled the speaker audio switch change state. If it is enabled then in step 404 the switch 512 opens. If it is not enabled then nothing happens. In step 408 an assessment is made to check if the controller has enabled the mic audio switch to change state. If it is enabled to open then in step 405 the switch 513 opens. If it is not enabled then nothing happens. In step 409 an assessment is made to check if the controller has enabled the button control switch 514 to change state. If it is enabled then in step 406 the switch 514 opens. If it is not enabled then nothing happens. This process is repeated for the button control switches 515, 516 and 517.

In the case of no power being available it means a switching logic 511 solution is needed that can operate in the absence of power. This implicitly means the assessment of power level in step 413 is zero but the steps 401, 402, 403 still need to be implemented. This can be implemented using a no-power normally closed analog switch. This can be implemented using a depletion mode JFET.

Figure 14:
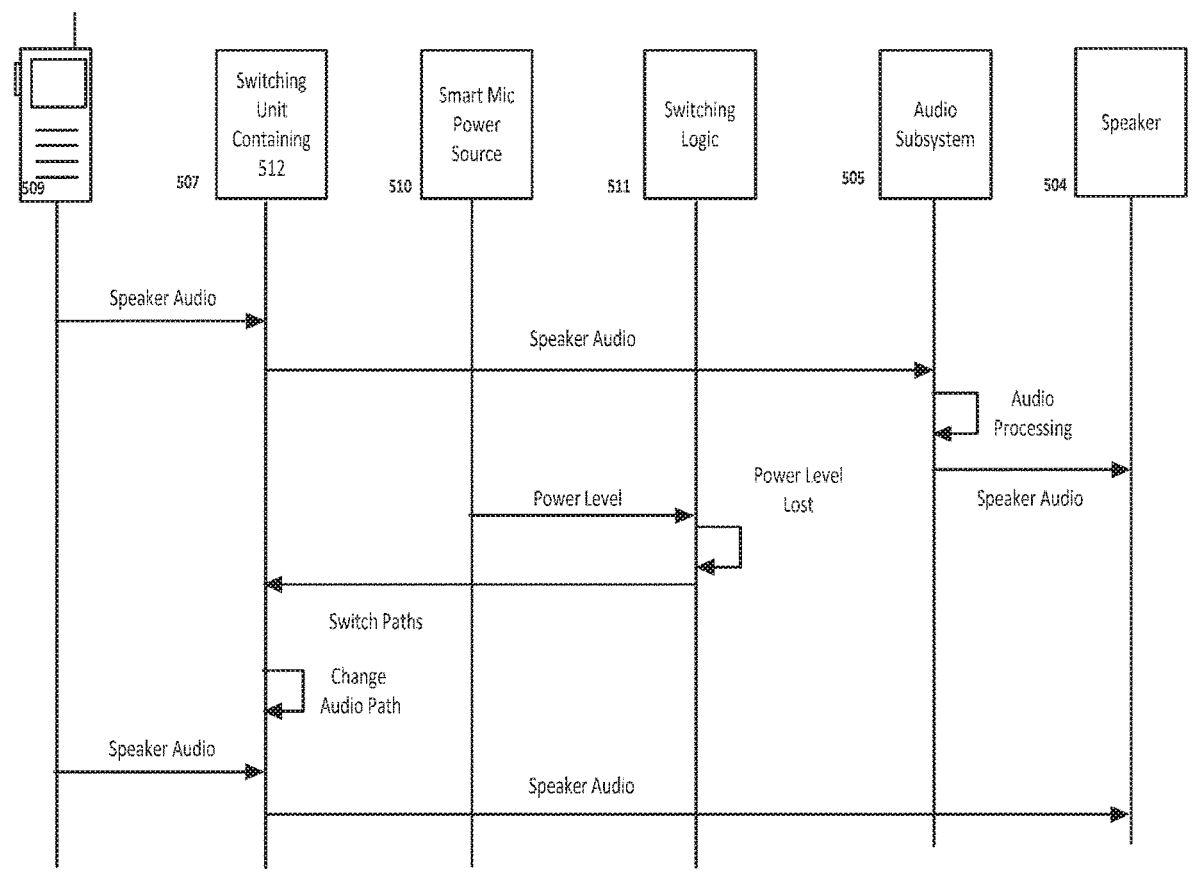
FIG. 14 shows a sequence diagram illustrating the process for switching speaker operation.

FIG. 14 shows a sequence diagram further illustrating this embodiment of the invention. Initially an attached device 509 (which in this case is an LMR radio) is channeling audio to the switching unit 507. The switch 512 is presently set such that the speaker audio is channeled to the audio subsystem 505 whereupon audio processing is undertaken before the audio is channeled to the speaker. The switching logic 511 is monitoring the power level and detects the power is lost resulting in the switching unit 507 containing switch 512 to change state. This results in the speaker audio from the attached device 509 being channeled directly to the speaker 504.

Figure 15:
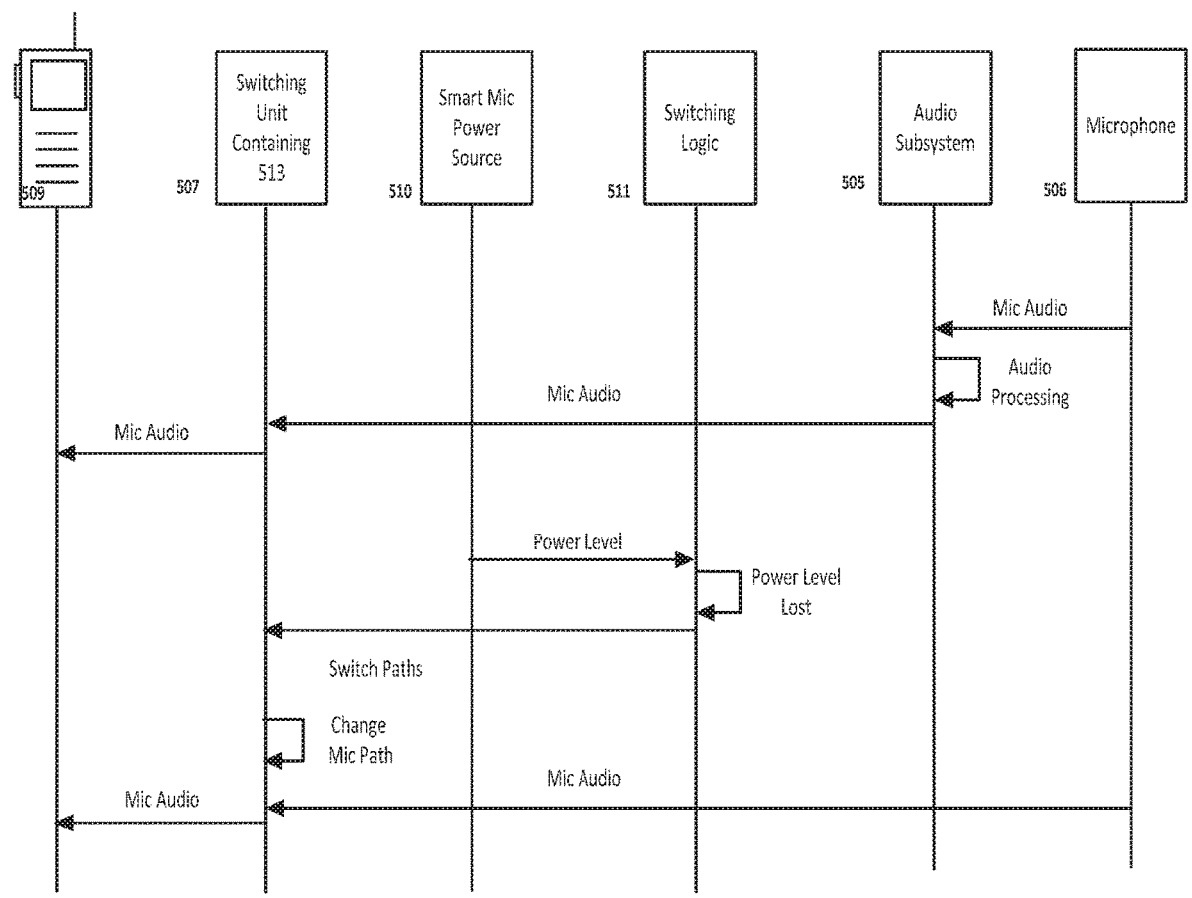
FIG. 15 shows a sequence diagram illustrating the process for switching microphone operation.

FIG. 15 shows a sequence diagram further illustrating the invention. Initially the audio from the microphone 506 is channeled to the audio subsystem 505 whereupon audio processing is undertaken before it is channeled to the switching unit which contains the switch 513 and the processed audio is channeled to the attached device 509. The switching logic 511 is monitoring the power level and detects the power is lost resulting in the switching unit 507 containing switch 513 to change state. This results in the audio from the microphone being channeled directly to the audio lines of the attached device 509.

Figure 16:
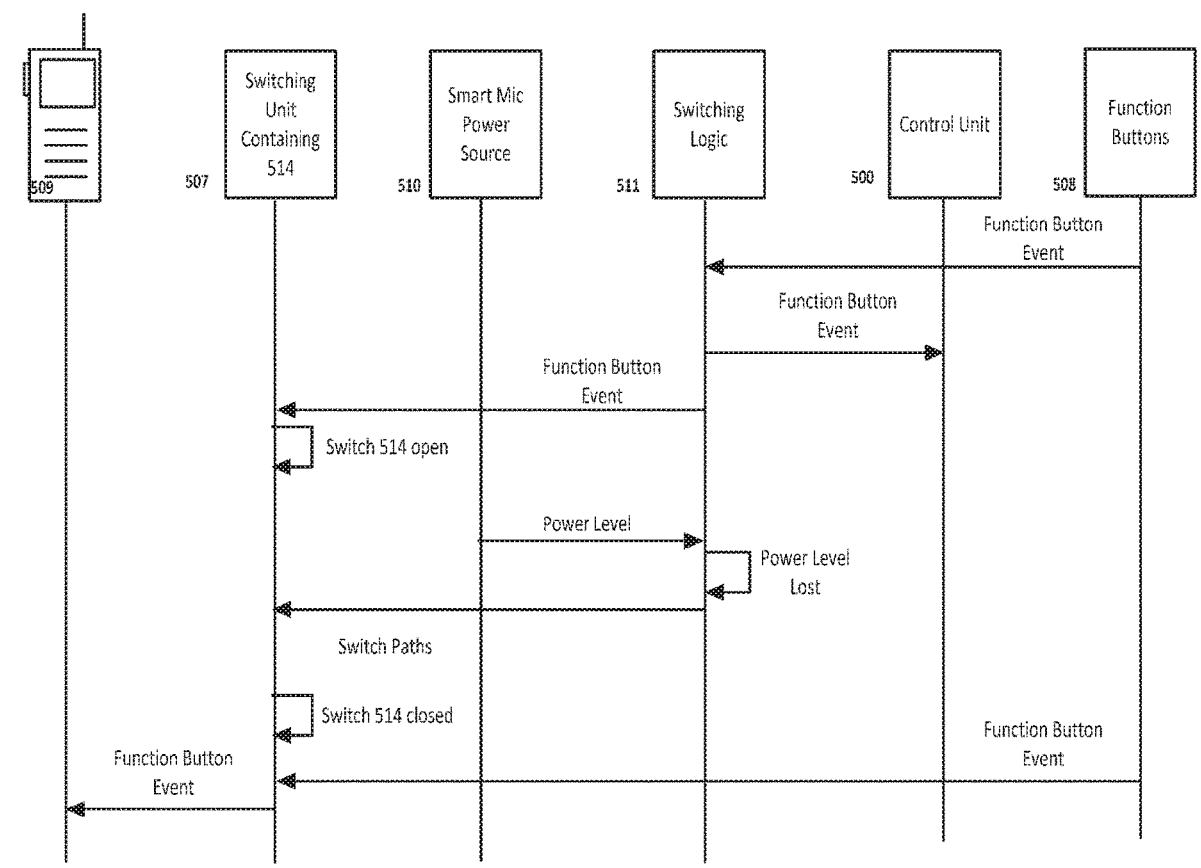
FIG. 16 shows a sequence diagram illustrating the process for switching function button operation.

FIG. 16 shows a sequence diagram further illustrating the invention.

A function button event 205 occurs whereupon this event is channeled through the switching logic 511. The switching logic channels the event to the control unit 500 and the control unit may take action. Additionally the switching logic 511 channels the event to the switching unit 507. Initially the switch 515 is open and that means the function button event is channeled no further. The switching logic 511 is monitoring the power level and detects the power is lost resulting in the switching unit 507 containing switch 515 to change state to closed. This means the next function button event 205 is channeled directly to the attached device 509.

The invention claimed is:

1. A wearable wireless communication system comprising:
   a primary processing device comprising a battery powered accessory having cellular communication capability;
   a secondary processing device comprising a battery powered handset having LMR communication capability; and
   a communication link between the primary and secondary processing devices;
   wherein the wearable system maintains audio and control functionality for a user by switching between cellular network communication via the primary processing device and LMR network communication via the secondary processing device,
   according to detection by the primary processing device of one or more predetermined switching events, comprising movement of the user between geographic areas by crossing a predefined geographic boundary configured in the wearable wireless communication system.

2. The system according to claim 1, wherein the switching events further comprise:
   relative strength or availability of cellular and LMR network coverage, or
   loss of power or other fault in either of the primary or secondary devices.

3. A method of operating a speaker microphone accessory in conjunction with an LMR radio, comprising:
   operating a first processor in the accessory which is capable of controlling speaker, microphone and function buttons on the accessory and providing cellular connectivity,
   operating a second processor in the LMR radio which is also capable of controlling the speaker, microphone and function buttons on the accessory and providing LMR connectivity,
   detecting a switching condition, and, in response to the switching condition, carrying out a step selected from the group consisting of:
   creating an alert for a user indicating that the switching condition is imminent so that the user can manually switch operation between accessory and radio,
   selectively passing operation of the speaker between the speaker microphone and the LMR radio,
   selectively passing operation of the microphone between the speaker microphone and the LMR radio, and
   selectively passing operation of the function buttons between the speaker microphone and the LMR radio.

4. The method according to claim 3, wherein the function buttons include a PTT button on the accessory for establishing an LMR call on the LMR radio.

5. The method according to claim 3, wherein the switching condition is based on geographic location.

6. The method according to claim 3, wherein the switching condition is based on signal strength of LMR relative to cellular.

7. The method according to claim 3, wherein the switching condition is based on a manual selection at the accessory or the radio.

8. The method according to claim 3, wherein the switching condition is based on availability of power in the speaker microphone.

9. The method according to claim 3, wherein an alert is created indicating to a user that a switching condition is imminent so that the user can manually switch operation from accessory to radio.

10. The method according to claim 3, wherein an LMR call is established in the LMR radio and additional audio processing is undertaken in the accessory.

11. A method of operating a radio speaker microphone comprising:
    providing a speaker, microphone and function buttons,
    operating the speaker, microphone and function buttons using a first power source in the speaker microphone,
    detecting the first power source is low and selectively shutting down functions of the speaker microphone to preserve operation of key functions,
    including one or more of:
    selectively shutting down the speaker and using the audio from the attached device,
    selectively shutting down the microphone and using the audio from the attached device,
    selectively shutting down the function buttons and using the buttons on the attached device.

12. The method according to claim 11, wherein key functions to be preserved include location functions.

13. A method of operating a speaker microphone accessory in conjunction with an LMR radio, comprising:
    operating a first processor in the accessory which is capable of controlling speaker, microphone and function buttons on the accessory and providing cellular connectivity,
    operating a second processor in the LMR radio which is also capable of controlling the speaker, microphone and function buttons on the accessory and providing LMR connectivity,
    detecting a switching condition, and in response to the switching condition,
    creating an alert for a user indicating that the switching condition is imminent so that the user can manually switch operation between accessory and radio.

14. The method according to claim 13, wherein the switching condition comprises:
    movement of the user between predetermined geographic areas, or
    relative strength or availability of cellular and LMR network coverage, or
    loss of power or other fault in either of the primary or secondary devices.

15. A speaker microphone for use in conjunction with an LMR radio, comprising:
    a processor in the speaker microphone which is capable of controlling speaker, microphone and function buttons on the speaker microphone and providing cellular connectivity, and a memory containing software instruction which cause the speaker microphone to:

detect a switching condition in the speaker microphone or the environment of the speaker microphone, and in response to a switching condition, create an alert for a user indicating that the switching condition is imminent so that the user can manually switch operation between speaker microphone and radio;

wherein a processor in the LMR radio is also capable of controlling the speaker, microphone and function buttons on the speaker microphone, and providing LMR connectivity.

16. The speaker microphone according to claim 15, wherein the switching condition comprises:

movement of the user between predetermined geographic areas, or relative strength or availability of cellular and LMR network coverage, or loss of power or other fault in either of the primary or secondary devices.

\* \* \* \* \*